J. R. ADAMS.
FIRE ENGINE.
No. 12,773.
Patented May 1, 1855
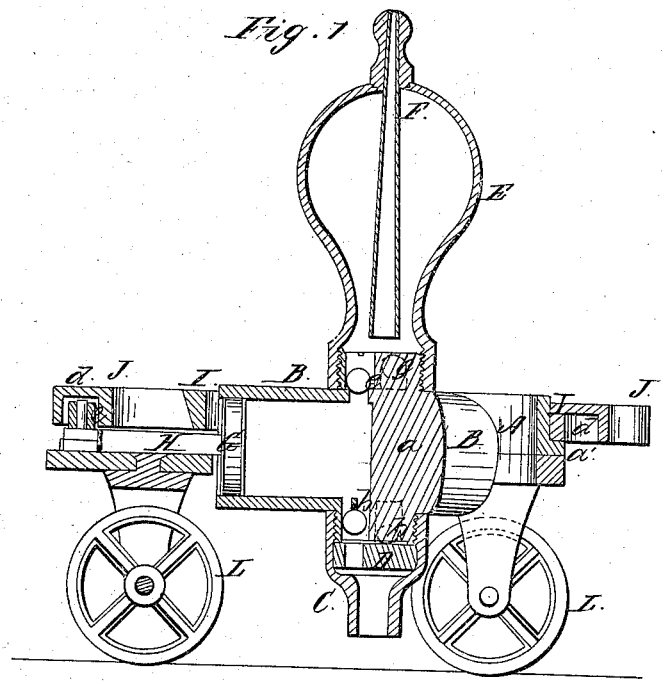
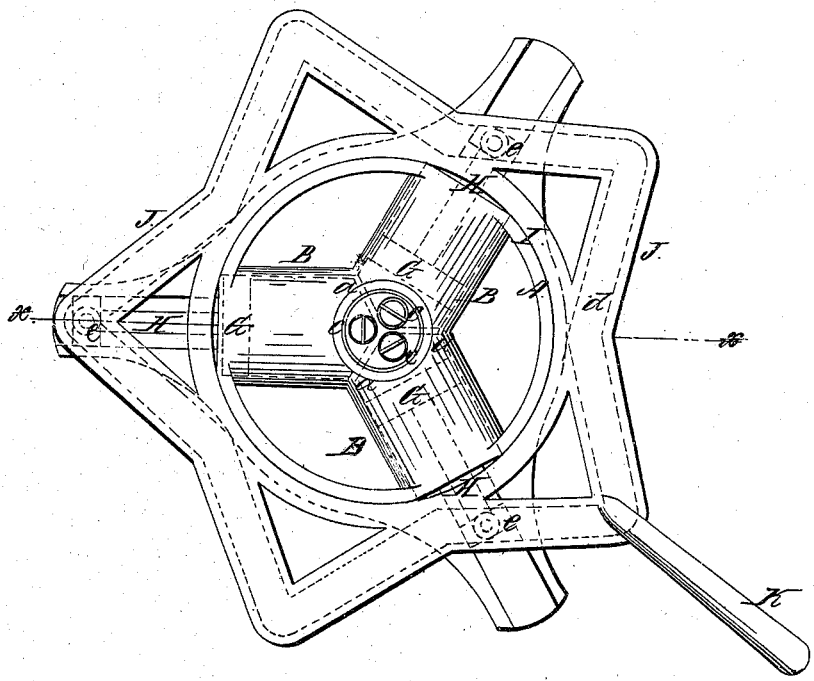

UNITED STATES PATENT OFFICE.

JOHN R. ADAMS, OF PORT JERVIS, NEW YORK.

FIRE-ENGINE.

Specification of Letters Patent No. 12,773, dated May 1, 1855.

*To all whom it may concern:*

Be it known that I, JOHN R. ADAMS, of Port Jervis, Orange county, State of New York, have invented a new and useful Improved Fire-Engine; and I do hereby declare that the following is a full, clear, and exact description of the same, reference being had to the annexed drawings, making a part of this specification, in which—

Figure 1 is a vertical section of my improved fire engine, (*x*) (*x*) Fig. 2, showing the plane of section. Fig. 2 is a plan or top view of ditto, the air chamber being removed.

Similar letters of reference indicate corresponding parts in the two figures.

The nature of my invention consists in having a number of cylinders placed radially in a circular band or ring, and having said band or ring encompassed by a cam which is allowed to work loosely around the band or ring. The cylinders are provided with the usual pistons and valves, and the pistons are operated by rotating the cam, the piston rods having rollers attached to their outer ends, said rollers fitting in the groove of the cam.

To enable others skilled in the art to fully understand and construct my invention I will proceed to describe it.

A, represents a ring or band in which are placed radially cylinders B, B, B, the cylinders are represented in Fig. 2, but more or less may be used. The cylinders at their junction are kept separate by partitions or heads (*a*) as shown by dotted lines in Fig. 2.

C, Fig. 1, is the suction pipe which is secured to the cylinders on their under sides and at their junction. The suction pipe adjoining the cylinders is provided with a valve seat D, on which are three ball valves (*b*) (*b*) (*b*), a valve to each cylinder. On the upper parts of the cylinders at their junction is secured an air chamber E, with which the cylinders communicate by ball valves (*c*) a valve to each cylinder, all of the valves (*c*) are shown in Fig. 2.

F, Fig. 1, is the eduction or force pipe passing through the air chamber E, the lower end of said pipe being a short distance above the valves (*c*).

G, G, G, are the piston heads of the cylinders, and H, H, H, are the piston rods.

The outer ends of the cylinders B, are open or are not obstructed by the ring or band A, which with the cylinders B, may be formed of a single casting.

I, is a ring or band which encompasses the ring or band A, the ring or band I, resting upon a flanch (*a'*) on the outer surface or periphery of the ring or band A, as clearly shown in Fig. 1. On the outer surface or periphery of the ring or band I, there is a zig zag rim J, having a groove (*d*) in its under surface in which (*e*) attached to the outer ends of the piston rods H are fitted, see Fig. 1, and dotted lines in Fig. 2. The rim J may have a suitable number of handles K, connected to it, one is shown in Fig. 2. The ring or band I, rim J, and handles K, may be formed of a single casting.

The whole machine may be supported by wheels L, as shown in Fig. 1, the bearings of the axes of the wheel being connected by flanches on the ring or band A.

The engine is operated by rotating the rim J, which is in fact a cam, and the piston rods H, and their heads G, are drawn in and out in consequence of the rollers (*e*) fitting in the groove (*d*), and the water passes upward successively in the cylinders B, through or around the valves (*b*) and is ejected successively from the cylinders through the valves (*c*) and force pipe F, the stream being continuous. The operation of the valves, and the use of the air chamber, being well known to all machinists and not differing essentially from those in use, require no particular description.

By the above improvement the whole power applied to the machine acts continually upon the pistons and is exerted in an advantageous manner, and horses may be attached to the arms or handles K. In the ordinary fire engines the power of one half of the men is lost or nearly so, because the pumps are worked by reciprocating arms, and the power can not be effectually applied to the machine, and they can only be worked by the fire men, while my improved engine may be worked with either men or horses.

The above invention may be used for ordinary pumps, and the cylinders B, and ring A, may if desired be placed vertically instead of horizontally.

Having thus described my invention, what

I claim as new and desire to secure by Letters Patent is:—

Having the cylinders B, placed radially in a band or ring A, and encompassing said band or ring A, with a band or ring I, and cam J, the band or ring I, and cam J, being allowed to rotate around the band or ring A, and cylinders B, and operating the pistons of the cylinders, in consequence of their connection with the cam as herein shown and described.

JOHN R. ADAMS.

Witnesses:
FRANCIS MARVIN,
STEPHEN C. MIRTEENES.